June 19, 1956  J. D. SAUER  2,751,485
SOLDERING TOOL
Filed Dec. 3, 1954
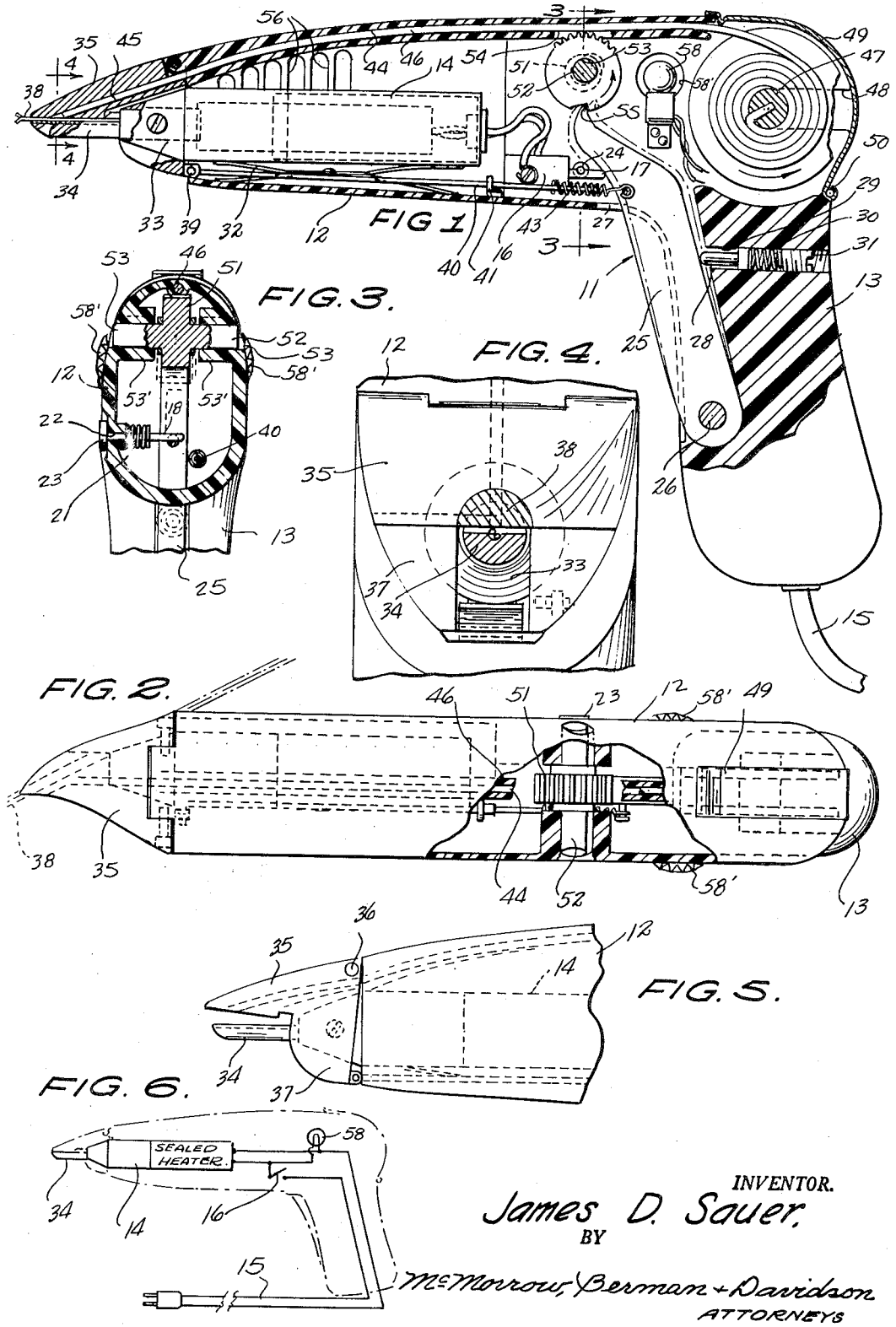
INVENTOR.
James D. Sauer,
BY
McMorrow, Berman + Davidson
ATTORNEYS

United States Patent Office 2,751,485
Patented June 19, 1956

2,751,485

SOLDERING TOOL

James D. Sauer, Columbus, Ohio

Application December 3, 1954, Serial No. 472,857

3 Claims. (Cl. 219—27)

This invention relates to soldering tools, and more particularly to an improved electrical soldering gun.

A main object of the invention is to provide a novel and improved soldering tool which is simple in construction, which is easy to operate, and which is especially designed to rapidly solder a wire joint, employing minimum wattage.

A further object of the invention is to provide an improved electrical soldering tool which is inexpensive to manufacture, which is rugged in construction, which provides maximum heat transfer to the work being soldered by the use of improved tip elements, and which provides a means for rapidly heating and soldering wires or other work with relatively little wattage.

Further objects and advantges of the invention will become apparent from the following description and claims, and from the accompanying drawings, wherein:

Figure 1 is a vertical longitudinal cross sectional view taken through an improved soldering tool constructed in accordance with the present invention.

Figure 2 is a top view, partly in horizontal cross section, of the soldering tool shown in Figure 1.

Figure 3 is a vertical transverse cross sectional view taken on the line 3—3 of Figure 1.

Figure 4 is an enlarged cross sectional detail view taken on the line 4—4 of Figure 1.

Figure 5 is a fragmentary side elevational view of the forward portion of the soldering tool of Figure 1.

Figure 6 is an electrical circuit diagram showing the electrical connections of the elements of the soldering tool of Figures 1 to 5.

Referring to the drawings, the soldering tool is designated generally at 11 and comprises a housing 12 of suitable refractory material, such as heat resisting plastic material, said housing being provided with the depending handle portion 13 located at the rear end of the housing. Mounted in the forward portion of the housing 12 is a conventional heating element 14 to which is connected a line cord 15, said cord extending through the handle 13 and into the housing 12 and being connected to the heating element 14 through a control switch 16.

As shown in Figure 1, the control switch 16 is located rearwardly adjacent the heating element 14 in the lower portion of the housing 12. The switch 16 is provided with an actuating plunger 17 which is biased outwardly by suitable spring means within the switch, the spring means acting to bias the plunger 17 outwardly toward a position wherein the switch is closed.

Designated at 18 is a locking plunger which is mounted in a side wall of the housing 12 adjacent the switch plunger 17, the locking plunger 18 having a head portion which is slidably disposed in a bore 22 provided in the side wall of the housing, a coiled spring 21 bearing against the plunger piston 18 and urging the plunger 18 inwardly. Secured to the outer end of the plunger shank is a button element 23 which is accessible from the outside of the housing for at times retracting the plunger 18. The switch operating plunger element 17 is provided with a transverse groove 24 adapted to receive the locking plunger 18 at times to lock the switch 16 in closed position.

Designated at 25 is a relatively large lever which is pivoted at 26 in the lower portion of the handle 13, the lever 25 extending upwardly into the housing 12 through a slot 27. The lever 25 is biased forwardly, namely, counterclockwise, as viewed in Figure 1, by a plunger 28 which is slidably mounted in a bore 29 formed in the upper portion of the handle 13, the plunger 28 being biased forwardly by a coiled spring 30 mounted in the bore 29 and bearing between the head of the plunger 28 and a screw plug 31 threadedly engaged in bore 29, as shown in Figure 1. The plunger 28 thus acts to bias the lever 25 forwardly, whereby the upper portion of the lever engages the end of the plunger 17.

Normally, namely, when the tool is not being used, the locking pin 18 is retracted, whereby the lever 25 holds the plunger 17 in an inwardly retracted position in the switch 16, the end of the locking plunger 18 engaging against the side of the forward portion of the plunger 17. When the lever 25 is rotated, as where the user exerts squeezing pressure thereon, causing the lever to be rotated clockwise, as viewed in Figure 1, the plunger 17 is released sufficiently for extension to a position wherein the locking plunger 18 is in registry with the groove 24, whereby the locking plunger 18 is moved into the groove 24, thereafter holding the switch 16 closed until the plunger 18 is manually retracted by means of its button element 23.

As shown in Figure 1, the heating element 14 is resiliently mounted on a spring bracket 32 and is thus resiliently supported in the forward portion of the housing 12. As shown in Figure 1, the housing 12 tapers at its forward portion, so that the forward end of the heating element 14, shown at 33, projects through the forward end of the housing 12. Secured to the forward end 33 of the heating element 14 is the concave soldering tip 34, which may be of any suitable shape, for example, may be formed with a longitudinal top channel to receive twisted wires to be soldered. Designated at 35 is a jaw member which is hingedly connected at 36 to the upper portion of the forward end of housing 12, said jaw member 35 having a depending portion 37 which surrounds the forward end 33 of heating element 14. The jaw member 35 is located in opposition to the longitudinal channel in the tip 34, whereby the jaw member 35 may cooperate with the tip 34 to grip the work to be soldered, for example, a pair of twisted wires shown at 38.

Pivotally connected at 39 to the lower portion of the depending member 37 is a longitudinally extending rod 40 which extends slidably through the lower portion of the housing 12, and is guided for longitudinal movement by an apertured bracket 41 secured in said lower portion of the housing. An expansion spring 43 connects the rear end portion of the rod 40 to the upper portion of the lever 25. However, when the lever 25 is rotated clockwise, as viewed in Figure 1, as when squeezing pressure is applied thereto, the rod member 40 exerts a tension on the jaw member 35 tending to urge the jaw member counterclockwise and thereby tending to urge said jaw member toward the tip 34, whereby clamping pressure may be exerted on the work positioned between jaw member 35 and tip 34, as will be presently described.

The top wall portion of the housing 14 is formed with a longitudinally extending passage 44 which is registrable with a similar passage 45 formed in the top portion of the jaw member 35. The passage 45 opens at the under side of the jaw member 35. The passages 44 and 45 are adapted to receive solder wire 46 from a roll of solder wire mounted on a transverse spindle 47 whose end portions are rotatably received in respective opposing longitudinal grooves 48 formed in the opposite side wall portions of the rear portion of housing 12. The rear portion of the housing is formed with a pivoted cover 49 which is hinged on a transverse axis at 50 to the top end of the handle 13, as shown in Figure 1, whereby the cover 49 may be rotated to an open position, allowing access to the rear space in the housing 12. Thus, when the cover 49 is opened, a spindle 47 carrying a roll of solder wire may be engaged in the grooves 48 and positioned as shown in Figure 1, the solder wire 46 being engaged through the passages 44 and 45 so that its end extends substantially to the bottom of the jaw 35.

Designated at 51 is a toothed wheel formed integrally on a transverse pin member 52 and located rearwardly adjacent the heater 14. The opposite side walls of the housing are formed with upwardly and rearwardly inclined parallel slots 53, 53 in which the opposite end portions of the pin member 52 are rotatably and slidably received, said side walls being thickened around said slots, as shown at 53', 53' in Figure 3. The top wall of the housing 12 is formed with a longitudinal slot 54 located above the toothed peripheral portion of the wheel 51, whereby said wheel may be elevated into the slot 54 and whereby the toothed peripheral portion of the wheel may at times engage with the solder wire 46 in the manner shown in Figure 1. As will be apparent from Figure 1, the slot 54 is in the same longitudinal vertical plane as the solder wire 46 and the toothed wheel 51.

The wheel 51 is formed at its lower portion with a notch 55 in which the pointed top end of the lever 25 is receivable. Thus, when squeezing pressure is exerted on the lever 25 to rotate said lever clockwise, as viewed in Figure 1, the wheel 51 is elevated and is also rotated counterclockwise, with its toothed peripheral portion engaging the solder wire 46, causing the solder wire to be advanced longitudinally through the passages 44 and 45.

The forward portions of the side walls of the housing 12 are formed with vertical ventilating slots 56.

Designated at 58 is a suitable pilot lamp which is mounted in the rear portion of the housing 12 and which is electrically connected in parallel with the heater 14. Jewelled windows 58' are provided in the side walls of said housing adjacent said lamp. When the heater 14 is energized, the pilot lamp 58 is simultaneously energized, providing an indication of the energization of said heater, since light from said pilot lamp will illuminate the jewelled windows 58'.

In using the device, the work to be soldered, for example, the twisted wires 38, are engaged in the longitudinal groove in the tip 34, and squeezing pressure is then exerted on the handle 13 and lever 25, causing the lever to be rotated clockwise, as viewed in Figure 1, and releasing the switch plunger 17 so that it moves rearwardly to close the switch, and at the same time allows the locking plunger 18 to slide into the groove 24. Rotation of lever 25 also causes the feed wheel 51 to be rotated, advancing the solder wire 46 into the space overlying the twisted wires 38. At the same time the jaw 35 is urged counterclockwise by the tension exerted on the rod 40, causing the work to be clamped. The heater 14 then transmits heat to the work through the tip 34 and causes the solder to melt and provide the desired soldered joint. When squeezing pressure on the handle is released, the heater remains energized but the jaw 35 is released by the action of the plunger 28 on lever 25 allowing the soldered work to be withdrawn. When the squeezing pressure is released on the lever 25, the feed wheel 51 is returned to its initial position, since the notch 55 remains in engagement with the pointed tip of the lever 25.

The expansion spring 43 in itself does not exert any biasing action on jaw 35. Said spring is provided to allow the feeding of the solder wire after the jaws are closed. Plunger member 28 exerts a biasing action on lever 25, urging lever 25 against the end of rod 40, and urging the jaw 35 upwardly. Spring 43 will aid in returning lever 25 towards rest position when the squeezing pressure on the handle is released.

When squeezing pressure is applied to the handle, rod 40 remains in contact with lever 25 until the jaws are closed. After this, the expansion spring 43 allows lever 25 to be rotated rearwardly sufficiently to feed the solder wire forwardly by rotating the feed wheel 51.

Other types of work may be soldered in the same manner as above described by providing suitable tips and jaws shaped to receive such work. Conventional soldering may be performed by merely employing a conventional tip in place of the tip 34 and by removing the pivoted jaw 35.

While a specific embodiment of an improved soldering tool has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A soldering tool comprising a housing having a depending handle portion, a heater in said housing, a forwardly projecting soldering tip secured to said heater, a jaw member hinged to said housing adjacent said soldering tip, said jaw member and housing being formed with registering passages arranged to receive solder wire, the passage of said jaw member opening adjacent said tip, a wheel member rotatably mounted in said housing and having a toothed upper portion projecting into the passage in said housing for engagement with said soldering wire, said wheel member having a notch in its lower portion, a lever pivoted to said depending handle portion and engaging in said notch, spring means biasing said lever forwardly, said lever being rotatable rearwardly responsive to squeezing force exerted on said handle portion, whereby the solder wire is advanced by the wheel member through said passages, means connecting said lever to said jaw member and being arranged to urge said jaw member toward said soldering tip responsive to rearward rotation of said lever, and switch means in said housing connected to said heater and controlled by said lever.

2. A soldering tool comprising a housing having a depending handle portion, a heater in said housing, a forwardly projecting soldering tip secured to said heater, a jaw member hinged to said housing adjacent said soldering tip, said jaw member and housing being formed with registering passages arranged to receive solder wire, the passage in said jaw member opening adjacent said tip, a wheel member rotatably mounted in said housing and having a toothed upper portion projecting into the passage in said housing for engagement with said soldering wire, said wheel member having a notch in its lower portion, a lever pivoted to said depending handle portion and engaging in said notch, spring means biasing said lever forwardly, said lever being rotatable rearwardly responsive to squeezing force exerted on said handle portion, whereby the solder wire is advanced by the wheel member through said passages, means connecting said lever to said jaw member and being arranged to urge said jaw member toward said soldering tip responsive to rearward rotation of said lever, and a switch in said housing connected in circuit with said heater, said switch having an operating plunger extending into engagement with said lever, said plunger being biased outwardly and being arranged to close said switch when extended outwardly, said lever normally holding said plunger in an inwardly retracted position and allowing said plunger to move outwardly when the lever is rotated rearwardly.

3. A soldering tool comprising a housing having a depending handle portion, a heater in said housing, a forwardly projecting soldering tip secured to said heater, a jaw member hinged to said housing adjacent said soldering tip, said jaw member and housing being formed with registering passages arranged to receive solder wire, the passage in said jaw member opening adjacent said tip, a wheel member rotatably mounted in said housing and having a toothed upper portion projecting into the passage in said housing for engagement with said solder wire, said wheel member having a notch in its lower portion, a lever pivoted to said depending handle portion and engaging in said notch, spring means biasing said lever forwardly, said lever being rotatable rearwardly responsive to squeezing force exerted on said handle portion, whereby the solder wire is advanced by the wheel member through said passages, means connecting said lever to said jaw member and being arranged to urge said jaw member toward said soldering tip responsive to rearward rotation of said lever, a switch in said housing connected in circuit with said heater, said switch having an operating plunger extending into engagement with said lever, said plunger being biased outwardly and being arranged to close said switch when extended outwardly, said lever normally holding said plunger in an inwardly retracted position and allowing said plunger to move outwardly when the lever is rotated rearwardly, a transversely extending locking pin slidably carried by said housing and engaging said plunger, and spring means urging said locking pin against said plunger, said plunger being formed with a recess in which said locking pin is engageable when said plunger is in an outwardly extending, switch-closing position.

References Cited in the file of this patent

UNITED STATES PATENTS 2,251,557    Weston _____ Aug. 5, 1941

FOREIGN PATENTS 507,997    Great Britain _____ June 22, 1939